US012561061B2

(12) United States Patent
Min et al.

(10) Patent No.: US 12,561,061 B2
(45) Date of Patent: Feb. 24, 2026

(54) THREE-DIMENSIONAL NAND MEMORY DEVICE AND SYSTEM AND METHOD FOR PERFORMING READ OPERATIONS THEREOF

(71) Applicant: Yangtze Memory Technologies Co., Ltd., Hubei (CN)

(72) Inventors: Yuanyuan Min, Hubei (CN); HongTao Liu, Hubei (CN); XiangNan Zhao, Hubei (CN); Lei Guan, Hubei (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/147,505

(22) Filed: Dec. 28, 2022

(65) Prior Publication Data

US 2024/0192857 A1 Jun. 13, 2024

(30) Foreign Application Priority Data

Dec. 8, 2022 (CN) .......................... 202211569383.5

(51) Int. Cl.
*G06F 3/06* (2006.01)

(52) U.S. Cl.
CPC .......... *G06F 3/0613* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2008/0049494 A1* | 2/2008 | Aritome | ............. | G11C 16/3418 |
| | | | | 365/185.02 |
| 2010/0329010 A1* | 12/2010 | Dong | ................. | G11C 16/3418 |
| | | | | 365/185.17 |
| 2012/0120727 A1* | 5/2012 | Kim | .................... | G11C 11/5642 |
| | | | | 365/185.17 |
| 2012/0236636 A1* | 9/2012 | Nawata | ............... | G11C 11/5628 |
| | | | | 365/185.18 |
| 2013/0128660 A1* | 5/2013 | Yoo | .................... | G11C 16/3418 |
| | | | | 365/185.02 |
| 2015/0016189 A1* | 1/2015 | Son | ......................... | G11C 16/10 |
| | | | | 365/185.11 |
| 2020/0005878 A1* | 1/2020 | Lu | ........................ | G11C 11/5642 |
| 2020/0211653 A1* | 7/2020 | Chen | .................... | G06F 11/1048 |
| 2022/0076761 A1* | 3/2022 | Lee | ............................ | G11C 7/04 |
| 2023/0134907 A1* | 5/2023 | Lee | .......................... | G11C 16/26 |
| | | | | 365/185.11 |
| 2024/0069746 A1* | 2/2024 | Lee | ........................ | G06F 3/0629 |
| 2024/0071545 A1* | 2/2024 | Oh | .......................... | G11C 29/42 |

FOREIGN PATENT DOCUMENTS

CN 116805503 A * 9/2023 ......... G11C 11/5642

* cited by examiner

*Primary Examiner* — Kevin Verbrugge
(74) *Attorney, Agent, or Firm* — Conley Rose, P.C.

(57) ABSTRACT

The present disclosure provides a memory device that includes memory cells addressed by word lines and bit lines and a peripheral circuit for performing a read operation for the memory device. The peripheral circuit is configured to apply a read voltage to a selected word line and apply a pass voltage to an unselected word line adjacent to the selected word line, wherein a magnitude of the pass voltage is adjusted according to the read voltage applied to the selected word line.

20 Claims, 9 Drawing Sheets

|  | ER | $V_{R1}$→ P1 | $V_{R2}$→ P2 | $V_{R3}$→ P3 | $V_{R4}$→ P4 | $V_{R5}$→ P5 | $V_{R6}$→ P6 | $V_{R7}$→ P7 |
|---|---|---|---|---|---|---|---|---|
| upper page | 1 | 1 | 1 | 0 | 0 | 0 | 0 | 1 |
| middle page | 1 | 1 | 0 | 0 | 1 | 1 | 0 | 0 |
| lower page | 1 | 0 | 0 | 0 | 0 | 1 | 1 | 1 |

FIG. 4B

THREE-DIMENSIONAL NAND MEMORY DEVICE AND SYSTEM AND METHOD FOR PERFORMING READ OPERATIONS THEREOF

CROSS-REFERENCE TO RELATED APPLICATIONS AND INCORPORATION BY REFERENCE

This application claims priority to Chinese Patent Application No. 202211569383.5, filed on Dec. 8, 2022, which is incorporated herein by reference in its entirety.

TECHNICAL FIELD

The present disclosure generally relates to the field of semiconductor technology, and more particularly, to performing a read operation in a NAND memory device and system.

BACKGROUND

As memory devices are shrinking to smaller die size to reduce manufacturing cost and increase storage density, scaling of planar memory cells faces challenges due to process technology limitations and reliability issues. A three-dimensional (3D) memory architecture can address the density and performance limitation in planar memory cells.

In a 3D NAND memory device, a memory array can include a plurality of memory strings vertically arranged on a substrate, each memory string having a plurality of memory cells that are vertically stacked. As such, storage density per unit area can be greatly increased. In a 3D NAND memory device, memory cells sharing the same word line can be programmed and read out simultaneously. During a read operation, a pass voltage can be applied to unselected word lines to switch on unselected memory cells, and a read voltage can be applied on a selected word line such that current flowing through a target memory cell can be sensed at a selected bit line. To ensure switching on all the unselected memory cells, the pass voltage usually is higher than the read voltage. The present disclosure is directed to optimization of related read operations in the 3D NAND memory device and system.

BRIEF SUMMARY

Embodiments of a three-dimensional NAND memory device and system and a method to perform a read operation in the NAND memory device and system are described in the present disclosure.

One aspect of the present disclosure provides a memory device that includes memory cells addressed by word lines and bit lines and a peripheral circuit for performing a read operation for the memory device. The peripheral circuit is configured to apply a read voltage to a selected word line and apply a pass voltage to an unselected word line adjacent to the selected word line, wherein a magnitude of the pass voltage is adjusted according to the read voltage applied to the selected word line.

In some embodiments, the read voltage comprises a first read reference voltage and a second read reference voltage that is higher than the first read reference voltage; and the pass voltage comprises a first pass voltage and a second pass voltage that is lower than the first pass voltage. The first pass voltage and the second pass voltage are applied to the unselected word line when the first read reference voltage and the second read reference voltage are applied to the selected word line, respectively.

In some embodiments, the read voltage further includes a first group of read reference voltages and a second group of read reference voltages that are higher than the first group of read reference voltages; the first pass voltage is applied to the unselected word line when any read reference voltage in the first group is applied to the selected word line; and the second pass voltage is applied to the unselected word line when any read reference voltage in the second group is applied to the selected word line.

In some embodiments, the peripheral circuit is further configured to apply a further pass voltage to a further unselected word line that is not adjacent to the selected word line, wherein the further pass voltage is lower than the pass voltage applied to the unselected word line adjacent to the selected word line.

In some embodiments, the pass voltage and the further pass voltage are configured to switch on the memory cells coupled to the pass voltage and the further pass voltage.

In some embodiments, the second pass voltage is higher than the further pass voltage by 0.5V to 1V, and the first pass voltage is higher than the further pass voltage by 1V to 2V.

In some embodiments, pass voltages, applied to two unselected word lines that are adjacent to the selected word line, comprise different magnitudes.

In some embodiments, the read voltage comprises one or more read reference voltages, and each of the one or more read reference voltages distinguishes two logic states of the memory cells.

Another aspect of the present disclosure provides a method for performing a read operation for a memory device, the memory device comprising memory cells addressable through word lines and bit lines. The method includes applying a read voltage to a selected word line; applying a pass voltage to an unselected word line adjacent to the selected word line, wherein a magnitude of the pass voltage is adjusted according to the read voltage applied to the selected word line.

In some embodiments, the method further comprises applying a first read reference voltage to the selected word line at a first time; applying a first pass voltage to the unselected word line at the first time; applying a second read reference voltage to the selected word line at a second time, wherein the second read reference voltage is higher than the first read reference voltage; and applying a second pass voltage to the unselected word line at the second time, wherein the second pass voltage is lower than the first pass voltage.

In some embodiments, the method further comprises applying the first pass voltage to the unselected word line when the read voltage applied to the selected word line comprises a first group of read reference voltages; and applying the second pass voltage to the unselected word line when the read voltage applied to the selected word line comprises a second group of read reference voltages, wherein the second group of read reference voltages comprise magnitudes higher than the first group of read reference voltages.

In some embodiments, the method further comprises applying a further pass voltage to a further unselected word line that is not adjacent to the selected word line, wherein the further pass voltage is lower than the pass voltage applied to the unselected word line adjacent to the selected word line.

In some embodiments, the pass voltage and the further pass voltage are configured to switch on the memory cells coupled to the pass voltage and the further pass voltage.

In some embodiments, the second pass voltage is higher than the further pass voltage by 0.5V to 1V, and the first pass voltage is higher than the further pass voltage by 1V to 2V.

In some embodiments, the method further comprises applying pass voltages comprising different magnitudes to two unselected word lines that are adjacent to the selected word line.

In some embodiments, the applying of the read voltage comprises applying one or more read reference voltages, wherein each of the one or more read reference voltages distinguishes two logic states of the memory cells.

Yet another aspect of the present disclosure provides a memory system that includes a memory controller and a memory device configured to receive instructions from the memory controller to perform a read operation. The memory device includes memory cells addressed by word lines and bit lines, and a peripheral circuit configured to apply a read voltage to a selected word line and apply a pass voltage to an unselected word line adjacent to the selected word line, wherein a magnitude of the pass voltage is adjusted according to the read voltage applied to the selected word line.

In some embodiments, the read voltage comprises a first read reference voltage and a second read reference voltage that is higher than the first read reference voltage; and the pass voltage comprises a first pass voltage and a second pass voltage that is lower than the first pass voltage, wherein the first pass voltage and the second pass voltage are applied to the unselected word line when the first read reference voltage and the second read reference voltage are applied to the selected word line, respectively.

In some embodiments, the read voltage further comprises a first group of read reference voltages and a second group of read reference voltages that are higher than the first group of read reference voltages; the first pass voltage is applied to the unselected word line when any read reference voltage in the first group is applied to the selected word line; and the second pass voltage is applied to the unselected word line when any read reference voltage in the second group is applied to the selected word line.

In some embodiments, the peripheral circuit is further configured to apply a further pass voltage to a further unselected word line that is not adjacent to the selected word line, wherein the further pass voltage is lower than the pass voltage applied to the unselected word line adjacent to the selected word line.

In some embodiments, the pass voltage and the further pass voltage are configured to switch on the memory cells coupled to the pass voltage and the further pass voltage.

In some embodiments, the second pass voltage is higher than the further pass voltage by 0.5V to 1V, and the first pass voltage is higher than the further pass voltage by 1V to 2V.

In some embodiments, pass voltages, applied to two unselected word lines that are adjacent to the selected word line, comprise different magnitudes.

In some embodiments, the read voltage comprises one or more read reference voltages, and each of the one or more read reference voltages distinguishes two logic states of the memory cells.

Other aspects of the present disclosure can be understood by those skilled in the art in light of the description, the claims, and the drawings of the present disclosure.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

FIG. 4B illustrates a mapping scheme of binary codes and the states of a NAND memory device, according to some embodiments of the present disclosure.

Figure 1A:
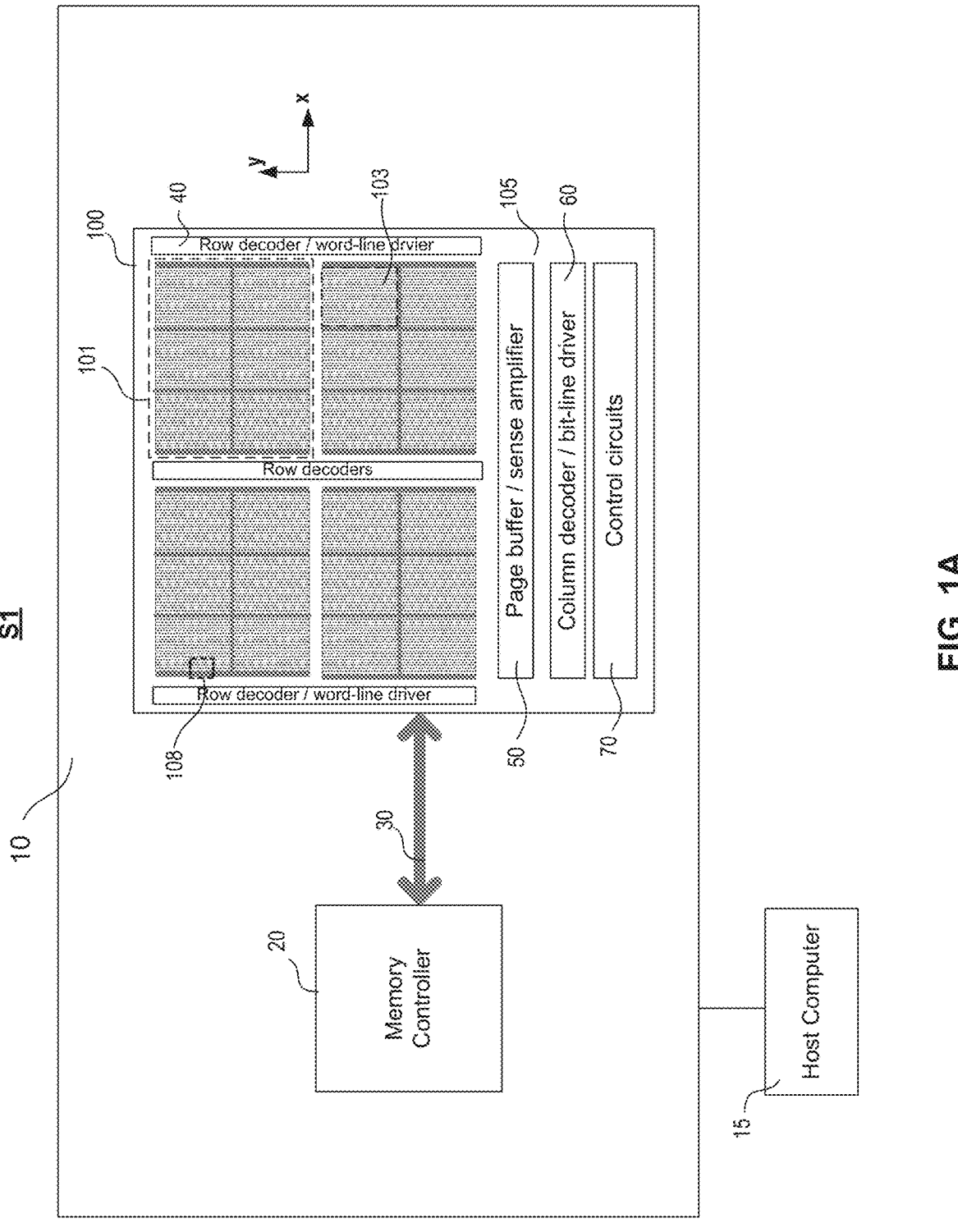
FIGS. 1A-1C illustrate a memory system with a NAND memory device, according to some embodiments of the present disclosure.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," etc., indicate that the embodiment described can include a particular feature, structure, or characteristic, but every embodiment can not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to affect such feature, structure or characteristic in connection with other embodiments whether or not explicitly described.

In general, terminology can be understood at least in part from usage in context. For example, the term "one or more" as used herein, depending at least in part upon context, can be used to describe any feature, structure, or characteristic in a singular sense or can be used to describe combinations of features, structures or characteristics in a plural sense. Similarly, terms, such as "a," "an," or "the," again, can be understood to convey a singular usage or to convey a plural usage, depending at least in part upon context. In addition, the term "based on" can be understood as not necessarily intended to convey an exclusive set of factors and may, instead, allow for existence of additional factors not necessarily expressly described, again, depending at least in part on context.

As used herein, the term "nominal/nominally" refers to a desired, or target, value of a characteristic or parameter for a component or a process step, set during the design phase of a product or a process, together with a range of values above and/or below the desired value. The range of values can be due to slight variations in manufacturing processes or tolerances. As used herein, the term "about" indicates the value of a given quantity that can vary based on a particular technology node associated with the subject semiconductor device. Based on the particular technology node, the term "about" can indicate a value of a given quantity that varies within, for example, 10-30% of the value (e.g., ±10%, ±20%, or ±30% of the value).

FIG. 1A illustrates a block diagram of an exemplary electronic apparatus S1 having a memory system 10, according to some embodiments of the present disclosure. The electronic apparatus S1 can be a mobile phone, a desktop computer, a laptop computer, a tablet, a vehicle computer, a gaming console, a printer, a positioning device, a wearable electronic device, a smart sensor, a virtual reality (VR) device, an augmented reality (AR) device or any other suitable electronic devices having storage therein. The memory system 10 includes a NAND memory device 100 and a memory controller 20, where the NAND memory device 100 can include any NAND memory device described below in the present disclosure. The memory system 10 can communicate with a host 15 through the memory controller 20, where by the memory controller 20 can be connected to the NAND memory device 100 via a memory channel 30. In some embodiments, the memory system 10 can have more than one NAND memory device 100, while each NAND memory device 100 can be managed by the memory controller 20.

In some embodiments, the host 15 can include a processor of an electronic device, such as a central processing unit (CPU), or a system-on-chip (SoC), such as an application processor (AP). The host 15 sends data to be stored at the memory system 10 or retrieves data by reading the memory system 10.

The memory controller 20 can handle I/O requests received from the host 15, ensure data integrity and efficient storage, and manage the NAND memory device 100. The memory channel 30 can provide data and control communication between the memory controller 20 and the NAND memory device 100 via a data bus.

Figure 1B:
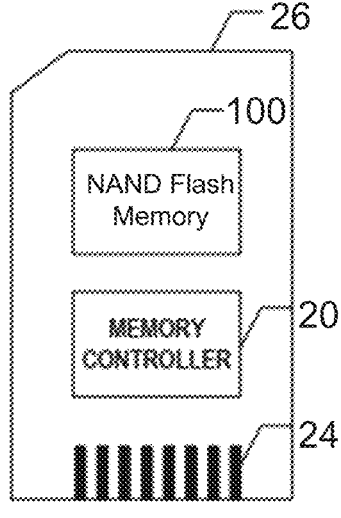
Figure 1C:
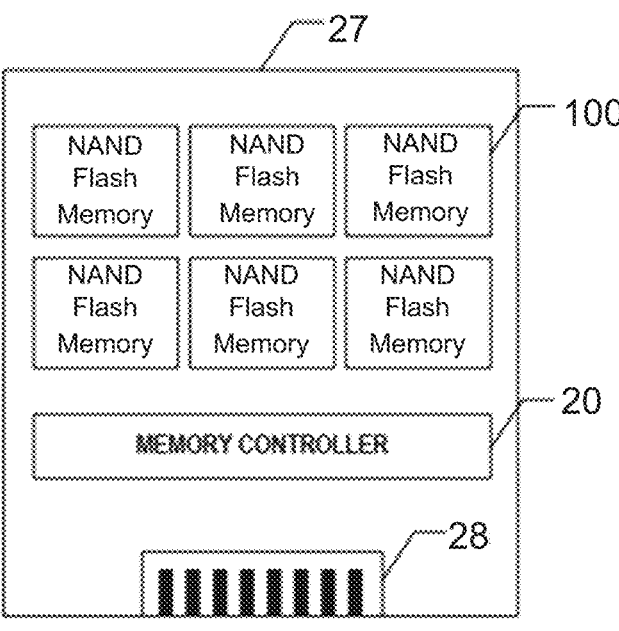

Memory controller 20 and one or more NAND memory device 100 can be integrated into various types of storage devices, for example, be included in the same package, such as a universal Flash storage (UFS) package or an eMMC package. That is, memory system 10 can be implemented and packaged into different types of end electronic products. In one example as shown in FIG. 1B, memory controller 20 and a single NAND memory device 100 can be integrated into a memory card 26. Memory card 26 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 26 can further include a memory card connector 24 coupling memory card 26 with a host (e.g., the host 15 in FIG. 1A). In another example as shown in FIG. 1C, memory controller 20 and multiple NAND memory devices 100 can be integrated into a solid state drive (SSD) 27. SSD 27 can further include an SSD connector 28 coupling SSD 27 with a host (e.g., the host 15 in FIG. 1A).

Referring to FIG. 1A, the NAND memory device 100 (i.e., "flash," "NAND flash" or "NAND") can be a memory chip (package), a memory die or any portion of a memory die, and can include one or more memory planes 101, each of which can include a plurality of memory blocks 103. Identical and concurrent operations can take place at each memory plane 101. The memory block 103, which can be megabytes (MB) in size, is the smallest size to carry out erase operations. Shown in FIG. 1A, the exemplary NAND memory device 100 includes four memory planes 101 and each memory plane 101 includes six memory blocks 103. Each memory block 103 can include a plurality of memory cells, where each memory cell can be addressed through interconnections such as bit lines and word lines. The bit lines and word lines can be laid out perpendicularly (e.g., in rows and columns, respectively), forming an array of metal lines. As shown in FIG. 1A, the bit lines and word lines can be laid out along x-direction and y-direction, respectively. In this disclosure, one or more memory block 103 can also be referred to as the "memory array" or "array." The memory array is the core area in a memory device, performing storage functions.

The NAND memory device 100 also includes a peripheral circuit region 105, an area surrounding memory planes 101. The peripheral circuit region 105, also named as peripheral circuits, contains many digital, analog, and/or mixed-signal circuits to support functions of the memory array, for example, page buffers/sense amplifiers 50, row decoders/word line drivers 40, column decoders/bit line drivers 60, and control circuits 70. Control circuits 70 include register, active and/or passive semiconductor devices, such as transistors, diodes, capacitors, resistors, etc., as would be apparent to a person of ordinary skill in the art. The control circuits 70 of the peripheral circuit region 105 can be configured to initiate a read or program operation on a select memory cell of a NAND memory string in the memory block 103. In some implementations, the control circuits 70 receives a read or program command from a memory controller (e.g., memory controller 20) through interface, and in response, sends control signals to at least row decoder/word-line driver 40, column decoder/bit-line driver 60, and voltage generators deposed in the peripheral circuit region 105 to initiate the read or program operation on the select memory cell.

It is noted that the layout of the electronic components in the memory system 10 and the NAND memory device 100 in FIG. 1A are shown as an example. The memory system 10 and the NAND memory device 100 can have other layout and can include additional components. For example, The NAND memory device 100 can also have high-voltage charge pumps, I/O circuits, etc. The memory system 10 can also include firmware, data scrambler, etc. In some implementations, the peripheral circuit region 105 and the memory array can be formed independently on separate wafers and then connected with each other through wafer bonding.

Figure 2:
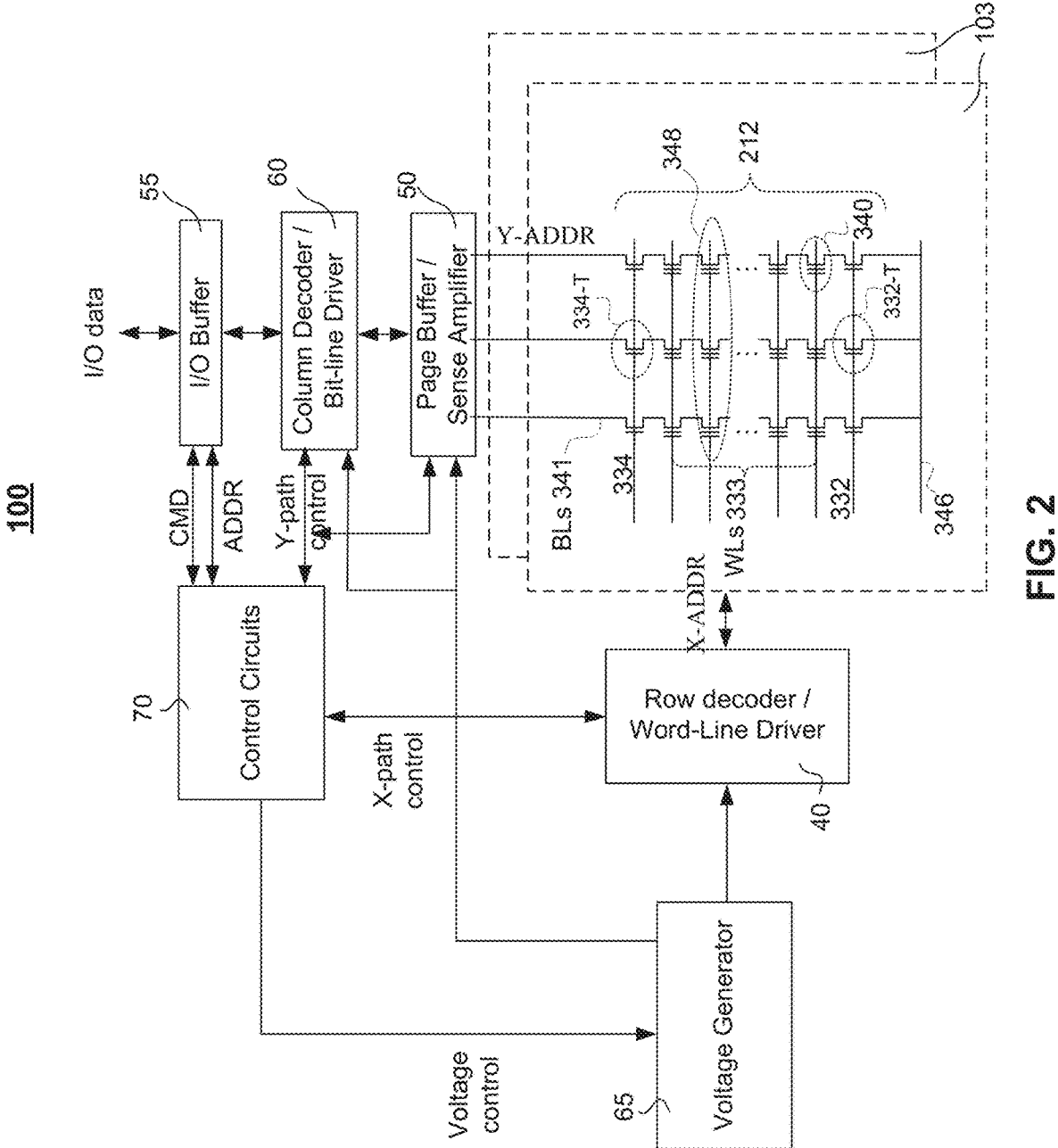
FIG. 2 shows a schematic circuit diagram of a NAND memory device, according to some embodiments of the present disclosure.

FIG. 2 shows a schematic diagram of the NAND memory device 100, according to some embodiments of the present disclosure. The NAND memory device 100 includes one or more memory blocks 103. Each memory block 103 includes memory strings 212. Each memory string 212 includes memory cells 340. The memory cells 340 sharing the same word line forms a physical memory page 448. The memory string 212 can also include at least one field effect transistor (e.g., MOSFET) at each end, which is controlled by a bottom select gate (BSG) 332 and a top select gate (TSG) 334, respectively. The drain terminal of a top select transistor 334-T can be connected to the bit line 341, and the source terminal of a bottom select transistor 332-T can be connected to an array common source (ACS) 446. The ACS 446 can be shared by the memory strings 212 in an entire memory block, and is also referred to as the common source line.

The NAND memory device 100 can also include a peripheral circuit that includes many digital, analog, and/or mixed-signal circuits to support functions of the memory block 103, for example, a page buffer/sense amplifier 50, a row decoder/word line driver 40, a column decoder/bit line driver 60, a control circuit 70, a voltage generator 65 and an input/output buffer 55. These circuits can include active and/or passive semiconductor devices, such as transistors, diodes, capacitors, resistors, etc., as would be apparent to a person of ordinary skill in the art.

The memory blocks 103 can be coupled with the row decoder/word line driver 40 via word lines ("WLs") 333, bottom select gates ("BSGs") 332 and top select gates ("TSG") 334. The memory blocks 103 can be coupled with the page buffer/sense amplifier 50 via bit lines ("BLs") 341. The row decoder/word line driver 40 can select one of the memory blocks 103 on the NAND memory device 100 in response to an X-path control signal provided by the control circuit 70. The row decoder/word-line driver 40 can transfer voltages provided from the voltage generator 65 to the control gates 333 according to the X-path control signal. During the read and program operation, the row decoder/word-line driver 40 can transfer a read voltage V.sub.read and a program voltage V.sub.pgm to a selected word line and a pass voltage V.sub.pass to an unselected word line according to the X-path control signal received from the control circuit 70.

The column decoder/bit-line driver 60 can transfer an inhibit voltage $V_{inhibit}$ to an unselected bit line and connect a selected bit line to ground according to a Y-path control signal received from the control circuit 70. In the other words, the column decoder/bit-line driver 60 can be configured to select or unselect one or more memory strings 212 according to the Y-path control signal from the control circuit 70. The page buffer/sense amplifier 50 can be configured to read and program (write) data from and to the memory block 103 according to the control signal Y-path control from the control circuit 70. For example, the page buffer/sense amplifier 50 can store one or more logic pages of data to be programmed into one physical memory page 448. In another example, page buffer/sense amplifier 50 can perform verify operations to ensure that the data has been properly programmed into each memory cell 340. In yet another example, during a read operation, the page buffer/sense amplifier 50 can sense current flowing through the bit line 341 that reflects the logic state (i.e., data) of the memory cell 340 and amplify small signal to a measurable magnification.

The input/output buffer 55 can transfer the I/O data from/to the page buffer/sense amplifier 50 as well as addresses ADDR or commands CMD to the control circuit 70. In some embodiments, the input/output buffer 55 can function as an interface between the memory controller 20 (in FIG. 1A) and the NAND memory device 100.

The control circuit 70 can control the page buffer/sense amplifier 50 and the row decoder/word-line driver 40 in response to the commands CMD transferred by the input/output buffer 55. During the programming operation, the control circuit 70 can control the row decoder/word-line driver 40 and the page buffer/sense amplifier 50 to program a target memory cell by selecting a word line and a bit line. The target memory cell addressed by the selected word line and the selected bit line can thereby programmed. During the read operation, the control circuit 70 can control the row decoder/word-line driver 40 and the page buffer/sense amplifier 50 to read the target memory cell. The X-path control signal and the Y-path control signal include a row address X-ADDR and a column address Y-ADDR that can be used to locate the target memory cell in the memory block 103. The row address X-ADDR can include a page index, a block index and a plane index to identify the physical memory page 448, memory block 103, and memory plane 101 (in FIG. 1A), respectively.

In some implementations, the control circuit 70 can include one or more control logic unit. Each control logic unit described herein can be either a software module and/or a firmware module running on a processor, such as a microcontroller unit (MCU), which is part of the control circuit 70, or a hardware module of a finite-state machine (FSM), such as an integrated circuit (IC, e.g., application-specific IC (ASIC), field-programmable gate array (FPGA), etc.), or a combination of software module, firmware module, and hardware module.

The voltage generator 65 can generate voltages to be supplied to word lines and bit lines under the control of the control circuit 70. The voltages generated by the voltage generator 65 include the read voltage $V_{read}$, the program voltage $V_{pgm}$, the pass voltage $V_{pass}$, the inhibit voltage $V_{inhibit}$, etc.

In some embodiments, the NAND memory device 100 can be formed based on the floating gate technology. In some embodiments, the NAND memory device 100 can be formed based on charge trapping technology. The NAND memory device based on charge trapping can provide high storage density and high intrinsic reliability. Storage data or logic states (e.g., threshold voltage $V_{th}$ of the memory cell 340) depends on the amount of charge trapped in a storage layer. In some embodiments, the NAND memory device 100 can be a three-dimensional (3D) memory device, where the memory cells 340 can be vertically stacked on top of each other.

Figure 3:
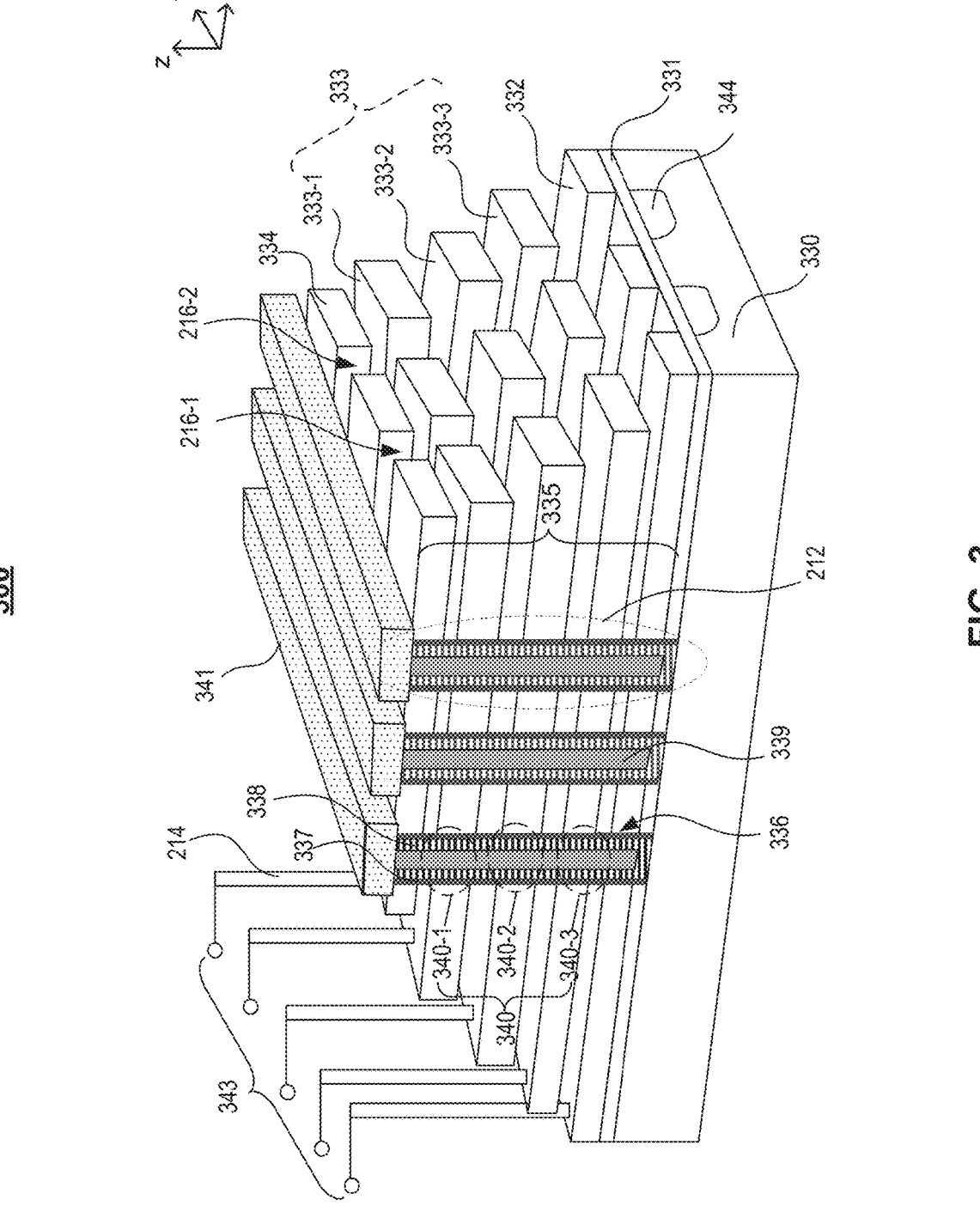
FIG. 3 illustrates a perspective view of a three-dimensional (3D) NAND memory device, in accordance with some embodiments of the present disclosure.

FIG. 3 illustrates a perspective view of a 3D NAND memory device 300, according to some embodiments of the present disclosure. The 3D NAND memory device 300 can be a portion of the NAND memory device 100 shown in FIG. 1A and can include a substrate 330, an insulating film 331 over the substrate 330, a tier of bottom select gates (BSGs) 332 over the insulating film 331, and tiers of control gates 333, also referred to as "word lines (WLs)," stacking on top of the BSGs 332 to form a film stack 335 of alternating conductive and dielectric layers in a z-direction. The dielectric layers adjacent to the tiers of control gates are not shown in FIG. 3 for clarity.

The control gates of each tier are separated by slit structures 216-1 and 216-2 through the film stack 335 in the x-direction (e.g., the word line direction). The 3D NAND memory device 300 also includes a tier of top select gates (TSGs) 334 over the stack of control gates 333. The stack of TSG 334, control gates 333 and BSG 332 is also referred to as "gate electrodes". The 3D NAND memory device 300 further includes memory strings 212 and doped source line regions 344 in portions of substrate 330 between adjacent BSGs 332. Each memory strings 212 includes a channel hole 336 extending through the insulating film 331 and the film stack 335 of alternating conductive and dielectric layers in the z-direction. Memory strings 212 also includes a memory film 337 on a sidewall of the channel hole 336, a channel layer 338 over the memory film 337, and a core filler 339 surrounded by the channel layer 338. The memory film 337 can include a barrier layer, a storage layer and a tunnel layer, where the storage layer of the memory film can be used to store electronic charges (e.g., electrons or holes). A memory cell 340 (e.g., 340-1, 340-2, 340-3) can be formed at the intersection of the control gate 333 (e.g., 333-1, 333-2, 333-3) and the memory string 212. A portion of the channel layer 338 responds to the respective control gate is also referred to as the channel of the memory cell. The 3D NAND memory device 300 further includes bit lines (BLs) 341 that extend in the y-direction (e.g., the bit line direction) and are connected with the memory strings 212 over the TSGs 334. The 3D NAND memory device 300 also includes metal interconnect lines 343 connected with the gate electrodes through contact structures 214. The edge of the film stack 335 is configured in a shape of staircase to allow an electrical connection to each tier of the gate electrodes.

In FIG. 3, for illustrative purposes, three tiers of control gates 333-1, 333-2, and 333-3 are shown together with one tier of TSG 334 and one tier of BSG 332. In this example, each memory string 212 can include three memory cells 340-1, 340-2 and 340-3, corresponding to the control gates 333-1, 333-2 and 333-3, respectively. In some embodiments, the number of control gates and the number of memory cells can be more than three to increase storage capacity. And the TSG 334 and BSG 332 can have more than one tier. The 3D NAND memory device 300 can also include other structures, for example, TSG cut, common source contact, array common source and dummy memory string. These structures are not shown in FIG. 3 for simplicity.

In a NAND memory device, read and programming operations can be performed to all memory cells 340 sharing the same word line, i.e., in the same physical memory page 448 in FIG. 2. In one example, a NAND memory device can be configured to operate in a single-level cell (SLC) mode. In this example, the memory cell 340 can be in an erased state ER or a programmed state P1. Initially, all memory cells 340 in the memory block 103 can be reset to the erased state ER as logic "1" by implementing a negative voltage difference between the control gates 333 and source terminals of the memory cells (e.g., the array common source 446) such that all the trapped electronic charges in the storage layer of the memory cells 340 can be removed. For example, the negative voltage difference can be induced by setting the control gates 333 of the memory cells 340 to ground, and applying a high positive voltage to the array common source 446. At the erased state ER ("state ER"), the threshold voltage V.sub.th of the memory cells 340 can be reset to the lowest value, and can be measured or sensed at the bit line 341. During programming (i.e., writing), the program voltage V.sub.pgm (e.g., a positive voltage pulse between 10 V and 25 V) can be applied on the control gate 333 such that electronic charges (e.g., electrons) can be injected into the storage layer of the memory cell 340, and thereby increase the threshold voltage V.sub.th of the memory cell 340. Thus the memory cell 340 can be programmed to the programmed state P1 (also referred to as state P1).

To increase storage capacity, a NAND memory device can also be configured to operate in a multi-level cell (MLC) mode, a triple-level cell (TLC) mode, a quad-level cell (QLC) mode, or a combination of any of these modes. In the SLC mode, a memory cell stores 1 bit and has two logic states (or "states"), i.e., states ER and P1. In the MLC mode, a memory cell stores 2 bits, and has four states, i.e., states ER, P1, P2, and P3. In the TLC mode, a memory cell stores 3 bits, and has eight states, i.e., states ER, and states P1-P7. In the QLC mode, a memory cell stores 4 bits and has 16 states (i.e., state ER and states P1-P15). In general, a memory cell in an xLC mode can have $2^n$ states and can store n-bit of data, where n is a whole number. For example, n equals 1, 2, 3, and 4 for SLC, MLC, TLC and QLC mode, respectively.

Figure 4A:
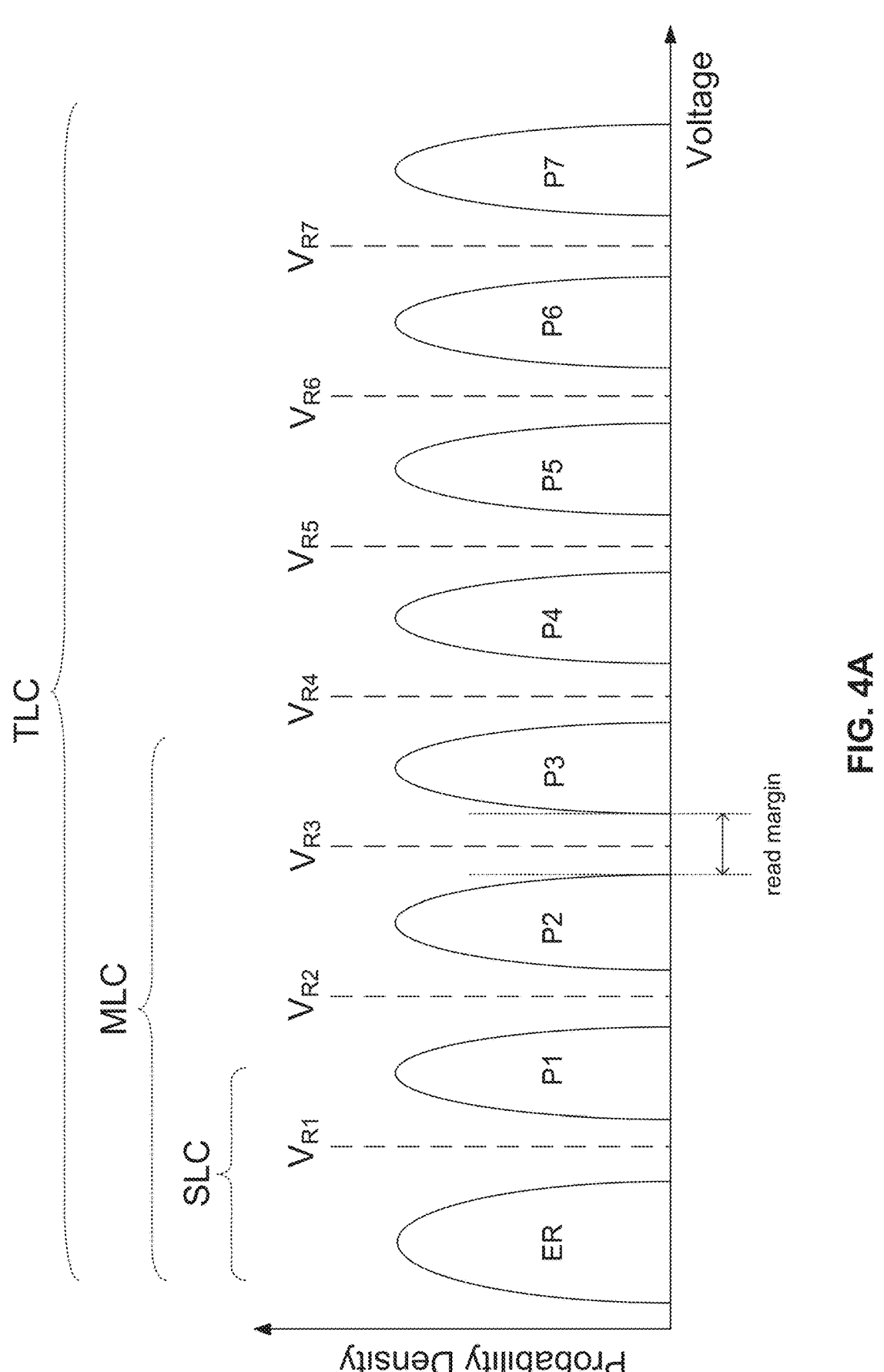
FIG. 4A illustrates threshold voltage distributions in a 3D NAND memory device, according to some embodiments of the present disclosure.

FIG. 4A illustrates a threshold voltage $V_{th}$ distribution of a NAND memory device programmed in the xLC mode, according to some embodiments of the present disclosure. Due to various variations, each state of the memory cells includes a range of threshold voltages $V_{th}$, where the threshold voltage $V_{th}$ distribution of each state can be represented by a probability density. In some embodiments, each state of the xLC mode (SLC, MLC, TLC, QLC, etc.) can be programmed by using an incremental step pulse programming (ISPP) scheme where the program voltage $V_{pgm}$ can be incrementally increased by adding a step pulse $V_{step}$. For example, the eight TLC states can be programmed from the state ER to the state P1 having a lower threshold voltage first, and then state P2, P3, . . . , to the state P7 having a higher threshold voltage. In some embodiment, the $2^n$ states of the xLC mode can be programmed from the state ER to the state P1, P2, . . . , P($2^n$–1) sequentially. As shown in FIG. 4, from the state ER to the state P($2^n$–1), threshold voltage $V_{th}$ of the memory cell increases. Therefore, the state ER is also referred to as a lowest state and the state P($2^n$–1) is also referred to as a highest state. A higher state has higher threshold voltages and a lower state has lower threshold voltages.

The states of a memory cell can be mapped into data in the form of binary codes stored in a NAND memory device. For example, the $2^n$ state of an n-bit memory cell can be represented in the form of a gray code. A gray code, i.e., reflected binary code (RBC) or reflected binary (RB), is an ordering of the binary numeral system such that two successive values differ in only one bit (binary digit). FIG. 4B illustrates a mapping scheme of n-bit binary codes and the states of a NAND memory device, according to some embodiments of the present disclosure. In this example, the eight states (states ER and P1-P7) in the TLC mode can correspond to 3-bit binary codes (111), (110), (100), (000), (010), (011), (001) and (101), respectively.

In the TLC mode, the 3 bits of the binary codes can be named as a most significant bit (MSB), a center significant bit (CSB), and a least significant bit (LSB), reading from left to right. For example, the state P5 can be mapped to the binary code (011), where the MSB, CSB and LSB are "0," "1," and "1," respectively. In some embodiments, the memory cells in the same physical memory page can be read or programmed simultaneously, where each memory cell can be programmed according to the programming data in the logic pages, e.g., in the TLC mode, the lower page, the middle page and the upper page corresponding to the LSB, CSB and MSB of the binary codes, respectively. During programming, logic pages of the n-bit binary codes (i.e., programming data) can be temporarily stored in the page buffers 50 (FIGS. 1A and 2).

It is noted that the scope of the present disclosure is not limited to the mapping scheme shown in FIG. 4B. The NAND memory device and system and the methods disclosed herein can be applied to a different set of binary codes associated with the $2^n$ states of xLC mode.

Referring back to FIG. 4A, the state of a memory cell can be determined by comparing the threshold voltage $V_{th}$ of the memory cell with one or more read reference voltages $V_R$ (e.g., $V_{R1}$, $V_{R2}$, ... ). State or data stored in the memory cells can thereby be determined. A read reference voltage $V_R$ can be selected within a read margin between two adjacent states, i.e., between a highest possible threshold voltage of a lower state and a lowest possible threshold voltage of a higher state. Using the eight TLC states ER and P1-P7 in FIG. 4A as an example, by applying the read reference voltages $V_{R1}$-$V_{R7}$ to the control gate of a target memory cell, the range of the memory cell's threshold voltage $V_{th}$ can be determined. For example, to verify if a target memory cell is at state ER, the read reference voltage $V_{R1}$ can be used. If the target memory cell is at state ER, the threshold voltage $V_{th}$ of the target memory cell is lower than the read reference voltage $V_{R1}$. The target memory cell can be switch on and form a conductive path in the channel. If the target memory cell is at any one of the states P1-P7, the threshold voltage $V_{th}$ of the target memory cell is higher than the read reference voltage $V_{R1}$. The target memory cell is thereby switched off. By measuring or sensing the current through the target memory cell at the corresponding bit line, the threshold voltage $V_{th}$ or the state of the target memory cell can be determined.

To determine the two states ER and P1 stored in the SLC mode, only the read reference voltage $V_{R1}$ is needed. To determine the four states ER and P1-P3 in the MLC mode, the read reference voltages $V_{R1}$, $V_{R2}$ and $V_{R3}$ can be used. To determine the eight states ER and P1-P7 for the TLC mode, the read reference voltages $V_{R1}$-$V_{R7}$ can be used. For example, in the TLC mode, the threshold voltage of state ER is below $V_{R1}$, and the threshold voltage of state P7 is above $V_{R7}$, where the threshold voltages of state P1 is between $V_{R1}$ and $V_{R2}$. States P2-P6 can be determined similarly. Likewise, in the QLC mode, 15 read reference voltages can be used to verify the 16 states (ER and P1-P15). To verify the $2^n$ states in the xLC mode, $2^n-1$ number of read reference voltages can be used. In some embodiments, a SLC read can be performed to separate two groups of logic states using a single read reference voltage. For example, by comparing threshold voltages of the memory cells with the read reference voltage $V_{R4}$, states ER and P1-P3 can be separated from states P4-P7.

Figures 5A, 5B:
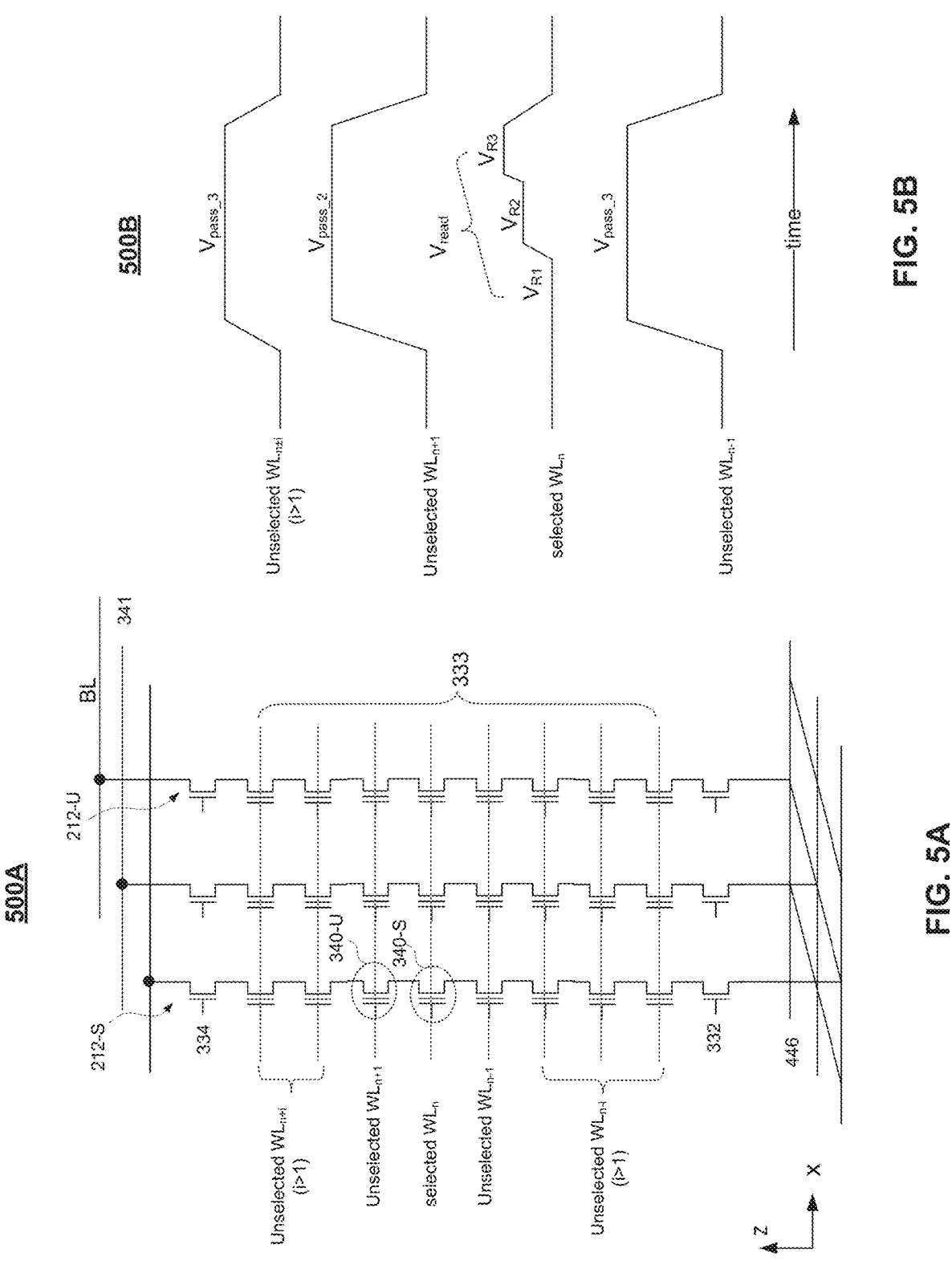
FIG. 5A illustrates a schematic circuit diagram of a 3D NAND memory device, according to some embodiments of the present disclosure.
FIG. 5B illustrates a waveform of a read operation for a 3D NAND memory device, according to some embodiments of the present disclosure.

FIGS. 5A and 5B illustrate a schematic diagram 500A of a NAND memory device and waveform 500B used during a read operation, according to some embodiments of the present disclosure. The NAND memory device in FIG. 5A can be the NAND memory device 100 shown in FIGS. 1A-1C and 2. The NAND memory device in FIG. 5A can also include the 3D NAND memory device 300 shown in FIG. 3.

To read data stored in a target memory cell 340-S in the selected memory string 212-S, a selected word line (e.g., $WL_n$) can be applied with a read voltage $V_{read}$, while unselected word lines (e.g., $WL_{n+1}$ and $WL_{n±1}$ with i>1) can be applied with a pass voltage $V_{pass}$ (e.g., a third pass voltage $V_{pass\_3}$ and a second pass voltage $V_{pass\_2}$ shown in FIG. 5B). In this example, the selected word line $WL_n$ is an nth word line counted from the BSG 332, and the unselected word lines $WL_{n±1}$ are adjacent to the selected word line $WL_n$, where the unselected word line $WL_{n+1}$ is above the selected word line $WL_n$ and the unselected word line $WL_{n-1}$ is below the selected word line $WL_n$. There is at least one word line between the unselected word lines $WL_{n±i}$ (with i>1) and the selected word line $WL_n$.

When the read voltage $V_{read}$ is applied to the selected word line $WL_n$, the memory cells coupled to the selected word line $WL_n$ can be switched on or off based on the threshold voltages of the memory cells. For the memory cells having threshold voltages $V_{th}$ lower than the read voltage $V_{read}$, the memory cells can be switched on. A conductive path can be formed in the channel of the memory cells. If the threshold voltage $V_{th}$ of the memory cell is higher than the read voltage $V_{read}$, the memory cell is switched off. By sensing the current at a selected bit line 212-S, the state of the target memory cell 340-S coupled to the selected word line $WL_n$ and the selected bit line 212-S, can be determined accordingly.

In some implementations, a memory cell can be programmed under the SLC, MLC, TLC, QLC or xLC mode to have 2, 4, 8, 16 or $2^n$ states, respectively. Accordingly, during the read operation, the read voltage $V_{read}$ can include one or more voltage levels. For example, to read the data from memory cells programmed in the MLC mode, the read voltage $V_{read}$ can include three read reference voltages $V_{R1}$, $V_{R2}$ and $V_{R3}$ to determine the four states (ER, P1, P2, and P3). See FIGS. 3 and 5B. To read data from memory cells programmed in the xLC mode, the read voltage $V_{read}$ can include $2^n-1$ read reference voltages $V_{R1}$, $V_{R2}$, $V_{R3}$, ... , $V_{R(2^n-1)}$, each of which distinguishes two logic states of the memory cells. In some embodiments, the read voltage $V_{read}$ can increase in an order from a lowest read reference voltage (e.g., $V_{R1}$) to a highest read reference voltage (e.g., $V_{R(2^n-1)}$) to determine whether the target memory cell is at a lowest state (i.e., the erased state ER) first and at last determine whether the target memory cell is at a highest state (i.e., the state $P(2^n-1)$). In some embodiments, a reserved order can be implemented in the read operation. In some embodiments, subsets of the $2^n-1$ read reference voltages $V_{R1}$, $V_{R2}$, $V_{R3}$, ... , $V_{R(2^n-1)}$ can be used to determine the logic state of the target memory cell according to the mapping scheme of logic states to binary codes. For example, under the TLC mode using the mapping scheme shown in FIG. 4B, a first subset of the read reference voltages, i.e., $V_{R3}$ and $V_{R7}$, can be used to determine the MSB of the target memory cell, while a second subset of the read reference voltages, i.e., $V_{R2}$, $V_{R4}$ and $V_{R6}$, can be used to determine the CSB of the target memory cell, and a third subset of the read reference voltages, i.e., $V_{R1}$ and $V_{R5}$, can be used to determine the LSB of the target memory cell. The order of applying the first subset of read reference voltages $V_{R3}$, $V_{R7}$, the second subset of read reference voltages $V_{R2}$, $V_{R4}$, $V_{R6}$, and the third subset of read reference voltages $V_{R1}$ and $V_{R5}$ can be in this order or in reverse or any other suitable order.

In some embodiments, the pass voltage $V_{pass}$ (e.g., the third pass voltage $V_{pass\_3}$ and the second pass voltage $V_{pass\_2}$) applied to the unselected word lines $WL_{n±1}$ and $WL_{n±i}$ (with i>1) can be any suitable voltage higher than the threshold voltage $V_{th}$ of the highest state of the memory cells (e.g., the state $P(2^n-1)$ of the xLC mode) such that all the unselected memory cells can be switched on during the read operation. In some embodiments, the read voltage $V_{read}$ can be any suitable voltage in a range between 0 V and 4 V, and the pass voltage $V_{pass}$ (e.g., $V_{pass\_3}$, $V_{pass\_2}$) can be in a range between 5V and 9V.

During a read operation, read disturbance can take place because of influence from the unselected memory cells adjacent to the target memory cell. Electronic charges stored in the adjacent memory cells can be electrically coupled to electronic charges stored in the target memory cell. As a result, the read margin of the target memory cell can be reduced. When the adjacent memory cells are at higher states with higher threshold voltages $V_{th}$, the number of electronic charges stored in the adjacent memory cells are larger and the coupling effect from the adjacent memory cells to the target memory cell can also be larger. When the target memory cell is at a lower state, the electronic charges stored in the target memory cell is less and the influence from the adjacent memory cells can be larger. Therefore, the reduction of the read margin for a lower state can be more severe than a higher state.

In some embodiments, as shown in FIG. 5B, the second pass voltage $V_{pass\_2}$ applied to the unselected word lines $WL_{n-1}$ and $WL_{n+1}$ adjacent to the selected word line $WL_n$ can be higher or larger than the third pass voltage $V_{pass\_3}$ applied to the other unselected word lines $WL_{n\pm i}$ (with i>1). The increased second pass voltage $V_{pass\_2}$ can form a stronger electric field to confine the electronic charges stored in the adjacent memory cells and thereby suppress the coupling effect from the adjacent memory cells to the target memory cell.

In the example of FIG. 5B, the unselected word lines $WL_{n-1}$ and $WL_{n+1}$ can be applied with the same second pass voltage $V_{pass\_2}$. In some embodiments, the unselected word lines $WL_{n-1}$ and $WL_{n+1}$ can be applied with pass voltages having different magnitude to fine tune the coupling effect from adjacent memory cells located below and above the target memory cells in a 3D NAND memory device. In the descriptions below, the same pass voltage is applied to the unselected word lines $WL_{n-1}$ and $WL_{n+1}$ for simplicity.

Although increasing the pass voltages can suppress coupling effect from adjacent memory cells during a read operation, the memory cells can suffer soft programming due to Fowler-Northeim (FN) tunneling induced by the increased pass voltage $V_{pass}$. Electronic charges (e.g., hot electrons) can be injected into the storage layer of the memory cells, causing shifts of the threshold voltages $V_{th}$ of the memory cells. Therefore, it is desired to optimize the pass voltage $V_{pass}$ (e.g., $V_{pass\_3}$ and $V_{pass\_2}$) applied to the unselected word lines $WL_{n\pm 1}$ and $WL_{n\pm i}$ (with i>1) to reduce read disturbance due to soft programming and the coupling effect from the adjacent memory cells.

Figures 6A, 6B:
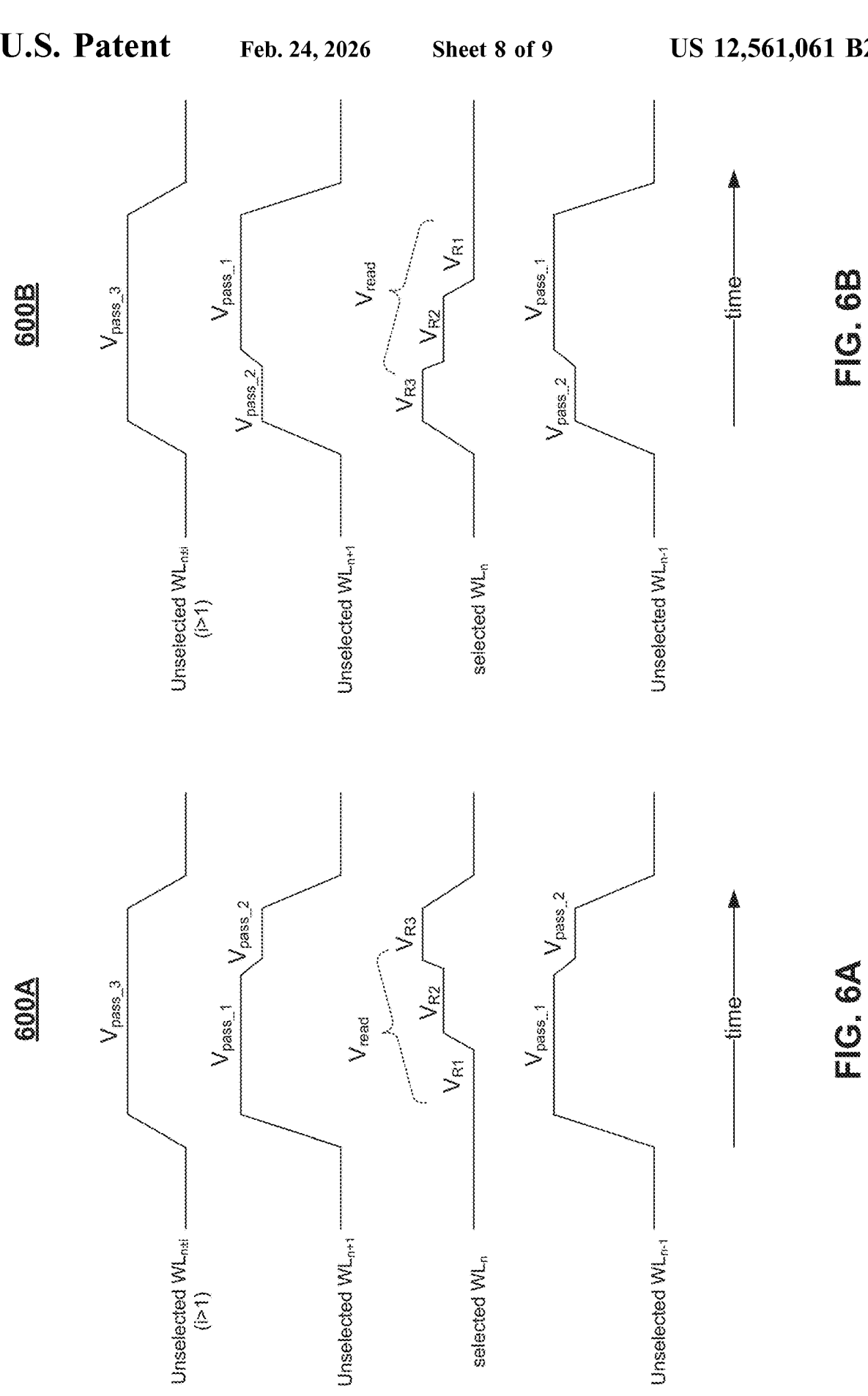
FIGS. 6A and 6B illustrate waveforms used in read operations for a 3D NAND memory device, according to some embodiments of the present disclosure.

FIGS. 6A and 6B illustrate waveforms 600A and 600B used in read operations for a NAND memory device, according to some embodiments of the present disclosure. The NAND memory device described in FIGS. 6A and 6B can be the NAND memory device 100 shown in FIGS. 1A-1C and 2, and can also include the 3D NAND memory devices shown in FIGS. 3 and 5A.

Similar to FIG. 5B, the read operations described in FIGS. 6A and 6B also include applying the read voltage $V_{read}$ to the selected word line $WL_n$, where the read voltage $V_{read}$ can include one or more of the $2^n-1$ read reference voltages $V_{R1}$, $V_{R2}$, $V_{R3}$, ..., $V_{R(2^n-1)}$ to read data, i.e., to determine which state among the $2^n$ states the target memory cell is at. In one example, the read voltage $V_{read}$ can increase in the order from the lowest read reference voltage $V_{R1}$ to the highest read reference voltage $V_{R(2^n-1)}$ to determine whether the target memory cell is at the state ER, state P1, P2, ... or P($2^n-1$). Shown as an example in FIG. 6A, three read reference voltages $V_{R1}$, $V_{R2}$ and $V_{R3}$ can be used as the read voltage $V_{read}$ to determine whether the target memory cell is at the erased state ER, state P1, P2 or P3. In another example, the read voltage $V_{read}$ can decrease in the order from the highest read reference voltage $V_{R(2^n-1)}$ to the lowest read reference voltage $V_{R1}$ to determine whether the target memory cell is at the state P($2^n-1$), state P($2^n-2$), P($2^n-3$), ..., P2, P1, or state ER. Shown as an example in FIG. 6B, three read reference voltages $V_{R3}$, $V_{R2}$ and $V_{R1}$ can be used as the read voltage $V_{read}$ to determine whether the target memory cell is at the state P3, P2, P1 or the erased state ER, which is in a reverse order from FIG. 6A.

It is noted that the three read reference voltages $V_{R1}$, $V_{R2}$ and $V_{R3}$ used to determine the erased state ER, state P1, P2 or P3, respectively, are illustrated as an example in FIGS. 5B, 6A and 6B. In some embodiments, the read voltage $V_{read}$ can include n subsets of the read reference voltages $V_{R1}$, $V_{R2}$, $V_{R3}$, ..., $V_{R(2^n-1)}$, which can be used to determine the n-bit binary codes representing the $2^n$ states, where each of the n subsets can include any suitable number of the read reference voltages $V_{R1}$, $V_{R2}$, $V_{R3}$, ..., $V_{R(2^n-1)}$ according to the mapping scheme (see e.g., FIG. 4B). For example, the read voltage $V_{read}$ can include a first subset of the read reference voltages $V_{R1}$, $V_{R2}$, $V_{R3}$, ..., $V_{R(2^n-1)}$ (e.g., $V_{R3}$ and $V_{R7}$) to determine a first bit of the binary code (e.g., the MSB in the TLC mode). The read voltage $V_{read}$ can include a second subset of the read reference voltages $V_{R1}$, $V_{R2}$, $V_{R3}$, ..., $V_{R(2^n-1)}$ (e.g., $V_{R2}$, $V_{R4}$ and $V_{R6}$) to determine a second bit of the binary code (e.g., the CSB in the TLC mode). The read voltage $V_{read}$ can also include a third subset of the read reference voltages $V_{R1}$, $V_{R2}$, $V_{R3}$, ..., $V_{R(2^n-1)}$ (e.g., $V_{R1}$ and $V_{R5}$) to determine a second bit of the binary code (e.g., the LSB in the TLC mode). While the first, second, and third bits of the binary code can be determined sequentially, any suitable order can be used and is within the scope of this disclosure. Furthermore, the read reference voltages $V_{R1}$, $V_{R2}$, $V_{R3}$, ..., $V_{R(2^n-1)}$ in each subsets can also be applied in any suitable order. In general, the read reference voltages $V_{R1}$, $V_{R2}$, $V_{R3}$, ..., $V_{R(2^n-1)}$ can be used to determine the n-bit of the binary codes corresponding to the $2^n$ states of the memory cells in the xLC mode.

Similar to the waveform 500B in FIG. 5B, the third pass voltage $V_{pass\_3}$ can be applied to the unselected word lines $WL_{n\pm i}$ (with i>1) that are not adjacent to the selected word line $WL_n$ in waveforms 600A and 600B. As discussed previously, the third pass voltage $V_{pass\_3}$ can be any suitable voltage that is higher than the threshold voltage $V_{th}$ of the highest state of the memory cells (i.e., the state P($2^n-1$) of xLC mode). The third pass voltage $V_{pass\_3}$ can be in a range between 5 V and 9 V.

Different from the waveform 500B in FIG. 5B, in waveforms 600A and 600B, each of the unselected word lines $WL_{n\pm 1}$ adjacent to the selected word line $WL_n$ can be applied with two or more pass voltages according to the magnitude of the read voltage $V_{read}$ applied to the selected word line $WL_n$, i.e., according to the states of the target memory cell to be determined during the read operation. For example, at a first time, a first read reference voltage (e.g., $V_{R1}$) can be applied to the selected word line $WL_n$ and a first pass voltage $V_{pass\_1}$ can be applied to the unselected word line $WL_{n+1}$. At a second time, a second read reference voltage (e.g., $V_{R3}$) that is higher than the first read reference voltage can be applied to the selected word line $WL_n$ and the second pass voltage $V_{pass\_2}$ that is lower than the first pass voltage $V_{pass\_1}$ can be applied to the unselected word line $WL_{n+1}$. Additionally, when the read voltage $V_{read}$ includes a first group of the read reference voltages (e.g., $V_{R1}$ and $V_{R2}$) used to determine a first group of the states of the target memory cells (e.g., the states ER and P1), the first pass voltage $V_{pass\_1}$ can be applied to the unselected word lines $WL_{n+1}$. When the read voltage $V_{read}$ includes a second group of the read reference voltages (e.g., $V_{R3}$) used to determine a second group of the states of the target memory cells (e.g., the states P2 and P3), the second pass voltage $V_{pass\_2}$ can be applied to the unselected word lines $WL_{n+1}$. While the second group of the states are higher states than the first group of states, the second group of the read reference voltages can be higher than the first group of the read reference voltages.

As discussed previously, the second pass voltage $V_{pass\_2}$ can be higher or larger than the third pass voltage $V_{pass\_3}$ such that the coupling effect from the adjacent memory cells to the target memory cell can be suppressed. Because the coupling effect from the adjacent memory cells on the target memory cell at a higher state (e.g., the second group of states) is relatively smaller, the second pass voltage $V_{pass\_2}$ can be increased with a first pre-given value from the third pass voltage $V_{pass\_3}$. In some implementation, the first pre-given value can be in a range between 0.5 V to 1 V. Because the coupling effect from the adjacent memory cells on the target memory cell at a lower state (e.g., the first group of states) is relatively larger, the first pass voltage $V_{pass\_1}$ can be increased with a second pre-given value from the third pass voltage $V_{pass\_3}$, where the second pre-given value is larger than the first pre-given value. In some implementation, the second pre-given value can be in a range between 1 V to 2 V. In the other words, the first pass voltage $V_{pass\_1}$ used when determining a lower state (e.g., the first group of states) can be higher or larger than the second pass voltage $V_{pass\_2}$ used when determining a higher state (e.g., the second group of states). As such, coupling effect from adjacent memory cells can be suppressed while soft programming due to high pass voltage can also be reduced by adjusting a magnitude of the pass voltage applied to the unselected word line $WL_{n+1}$ adjacent to the selected word line $WL_n$ according to the read voltage applied to the selected word line $WL_n$.

In general, the read voltage $V_{read}$ can be divided into any suitable number of groups and is not limited to two groups as illustrated in FIGS. 6A and 6B, where each group can include one or more of the read reference voltages $V_{R1}$, $V_{R2}$, $V_{R3}$, . . . , $V_{R(2^n-1)}$ for determining the $2^n$ states in the xLC mode. In one example, each read reference voltage in the second group can have a magnitude higher than any read reference voltage in the first group. In this example, the second pass voltage $V_{pass\_2}$, applied to the unselected word lines $WL_{n\pm1}$ when the second group of read reference voltages are applied as the read voltage $V_{read}$ to the selected word line $WL_n$, can have a magnitude lower than the first pass voltage $V_{pass\_1}$ applied to the unselected word lines $WL_{n+1}$ when the first group of read reference voltages are applied as the read voltage $V_{read}$ to the selected word line $WL_n$.

Figure 7:
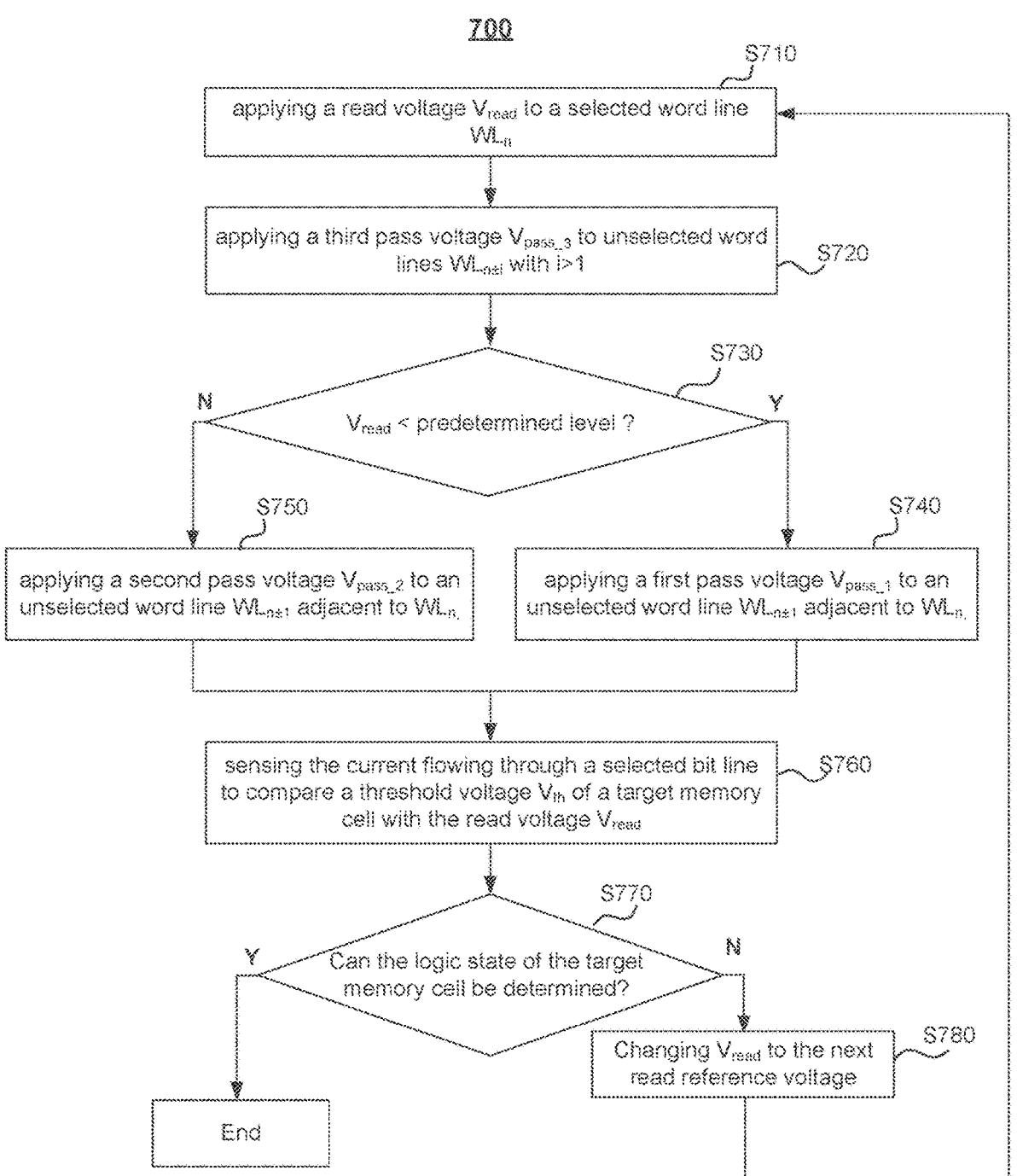
FIG. 7 illustrates a method for performing read operations in a 3D NAND memory device, according to some embodiments of the present disclosure.

FIG. 7 illustrates a method 700 of a read operation for a NAND memory device, according to some embodiments of the present disclosure. It should be understood that the method 700 is not exhaustive and that other operation steps can be performed as well before, after, or between any of the illustrated operation steps. In some embodiments, some operation steps of method 700 can be omitted or other operation steps can be included, which are not described here for simplicity. In some embodiments, operation steps of method 700 can be performed in a different order and/or vary.

In the examples showing in FIGS. 6A-6B and 7, the following operation steps can be implemented to read data from a NAND memory device.

At operation step S710, the read voltage $V_{read}$ can be applied to the selected word line $WL_n$, where the read voltage $V_{read}$ can be set with an initial read reference voltage, for example, the read reference voltage $V_{R1}$.

At operation step S720, the third pass voltage $V_{pass\_3}$ can be applied to the unselected word lines $WL_{n\pm i}$ (with i>1) that are not adjacent to the selected word line $WL_n$, i.e., there is at least one word line between the selected word line $WL_n$ and the unselected word lines $WL_{n\pm i}$. The third pass voltage $V_{pass\_3}$ is any suitable voltage higher than the threshold voltage $V_{th}$ of the highest state of the memory cells (i.e., the state $P(2^n-1)$) such that all the unselected memory cells can be switched on.

At operations step S730, the method 700 checks whether the read voltage $V_{read}$ is smaller than or below a predetermined level. For example, the method 700 can check whether the read voltage $V_{read}$ is in a first group of read reference voltages that used to determining a lower state. In the examples in FIGS. 6A and 6B, the first group of read reference voltages include the read reference voltages $V_{R1}$ and $V_{R2}$ used for determining the states ER and P1.

If the read voltage $V_{read}$ is smaller than or below the predetermined level, or any read reference voltage in the first group is applied as the read voltage $V_{read}$, the first pass voltage $V_{pass\_1}$ can be applied to the unselected word lines $WL_{n\pm1}$ that are adjacent to the selected word line $WL_n$ at operation step S740.

If the read voltage $V_{read}$ is not smaller than or below the predetermined level, for example, if the read voltage $V_{read}$ is in the second group of read reference voltages (e.g., the read reference voltage $V_{R3}$), the second pass voltage $V_{pass\_2}$ can be applied to the unselected word lines $WL_{n+1}$ that are adjacent to the selected word line $WL_n$ at operation step S750. The first pass voltage $V_{pass\_1}$ is larger than the second pass voltage $V_{pass\_2}$, while the second pass voltage $V_{pass\_2}$ is larger than the third pass voltage $V_{pass\_3}$.

At operation step S760, the threshold voltage $V_{th}$ of the target memory cell can be compared with the read voltage $V_{read}$ by sensing the current flowing through a selected bit line. If the current is higher than a pre-given current level, the target memory cell can be considered as switched on and the threshold voltage $V_{th}$ of the target memory cell can be considered lower than the read voltage $V_{read}$. If the current is not higher than the pre-given current level, the target memory cell can be considered as switched off and the threshold voltage $V_{th}$ of the target memory cell can be considered not lower than the read voltage $V_{read}$.

At operation step S770, if the logic state of the target memory cell can be determined, the read operation can be ended. For example, when the read reference voltage $V_{R1}$ is set as the read voltage $V_{read}$ and it is determined that the threshold voltage $V_{th}$ of the target memory cell is lower than the read voltage $V_{read}$, then the target memory cell is at the erased state ER. See FIG. 4A. Similarly, when the read voltage $V_{read}$ is the highest read reference voltage, for example, $V_{R(2^n-1)}$, the target memory cell can be considered at the highest state $P(2^n-1)$ if the threshold voltage $V_{th}$ of the target memory cell is not lower than the read reference voltage $V_{R(2^n-1)}$, and the read operation can also be ended.

If the logic state of the target memory cell cannot be determined at the operation step S770, the read voltage $V_{read}$ can be changed to the next read reference voltage at operation step S780, the read operation can be continued and repeated at the operation step S710. For example, if the read voltage $V_{read}$ is set at the read reference voltage $V_{R1}$ and it is determined that the threshold voltage $V_{th}$ of the target memory cell is not lower than the read voltage $V_{read}$, then the state of the target memory cell cannot be determined solely based on the read reference voltage $V_{R1}$. In one example, the read voltage $V_{read}$ can be set at the read reference voltage $V_{R2}$ and the operation steps S710-S770 can be repeated again. If the threshold voltage $V_{th}$ of the target memory cell is lower than the read reference voltage $V_{R2}$, then it can be determined that the target memory cell is at the state P1.

In one implementation, the read voltage $V_{read}$ can be applied to the selected word line in an increasing order, e.g., from the read reference voltages $V_{R1}$, $V_{R2}$, $V_{R3}$, . . . to $V_{R(2^n-1)}$, and the threshold voltage $V_{th}$ of the target memory cell can be compared with the read reference voltage $V_{R1}$, $V_{R2}$, $V_{R3}$, . . . to $V_{R(2^n-1)}$ sequentially in the increasing order. In this implementation, if the threshold voltage $V_{th}$ of the target memory cell is lower than the read reference voltage $V_{Rm}$, then the target memory cell can be considered at the state P(m−1) (with m=1, 2, . . . , $2^n-1$).

In another implementation, the read voltage $V_{read}$ can be applied to the selected word line in a decreasing order, e.g., from the read reference voltages $V_{R(2^n-1)}$, $V_{R(2^n-2)}$, . . . to $V_{R1}$, and the threshold voltage $V_{th}$ of the target memory cell can be compared with the read reference voltages $V_{R(2^n-1)}$, $V_{R(2^n-2)}$, . . . to $V_{R1}$ sequentially in the decreasing order. In this implementation, if the threshold voltage $V_{th}$ of the target memory cell is not lower than the read reference voltage $V_{Rm}$, then the target memory cell can be considered at the state P(m) (with m=1, 2, . . . , $2^n-1$).

Yet in another implementation, the read voltage $V_{read}$ can be set to the read reference voltages $V_{R1}$, $V_{R2}$, $V_{R3}$, . . . , $V_{R(2^n-1)}$ according to the mapping scheme (e.g., in FIG. 4B) of the n-bit binary code, for example, in the order of $V_{R3}$, $V_{R7}$, then $V_{R2}$, $V_{R4}$, $V_{R6}$, followed by $V_{R1}$ and VRs to determine the MSB, CSB and LSB of the 3-bit binary code in the TLC mode. In this implementation, the threshold voltage $V_{th}$ of the target memory cell can be compared with the read reference voltages $V_{R3}$, $V_{R7}$, then $V_{R2}$, $V_{R4}$, $V_{R6}$, followed by $V_{R1}$ and $V_{R5}$.

In FIG. 7, at operation step S730, the read reference voltages can be divided into two groups, i.e., the first group having magnitudes smaller than the predetermined level, and the second group having magnitudes not smaller than the predetermined level, where two different pass voltages are applied accordingly to the unselected word line $WL_{n\pm1}$. It is noted that the read reference voltages $V_{R1}$, $V_{R2}$, $V_{R3}$, . . . , $V_{R(2^n-1)}$ for determining the $2^n$ states in the xLC mode can be divided into any suitable number of groups where different pass voltages can be applied accordingly to the unselected word line $WL_{n+1}$. Each group can include one or more of the read reference voltages. When the read voltage $V_{read}$ applied to the selected word line $WL_n$ is set with a read reference voltage in the group having higher magnitudes, the corresponding pass voltage applied to the unselected word line $WL_{n+1}$ can be set lower. Vice versa, when the read voltage $V_{read}$ applied to the selected word line $WL_n$ is set with a read reference voltage in the group having lower magnitudes, the corresponding pass voltage applied to the unselected word line $WL_{n\pm1}$ can be set higher.

In summary, the present disclosure provides a memory device that includes memory cells addressed by word lines and bit lines and a peripheral circuit for performing a read operation for the memory device. The peripheral circuit is configured to apply a read voltage to a selected word line and apply a pass voltage to an unselected word line adjacent to the selected word line, wherein a magnitude of the pass voltage is adjusted according to the read voltage applied to the selected word line.

The present disclosure also provides a method for performing a read operation for a memory device, the memory device comprising memory cells addressable through word lines and bit lines. The method includes applying a read voltage to a selected word line; applying a pass voltage to an unselected word line adjacent to the selected word line, wherein a magnitude of the pass voltage is adjusted according to the read voltage applied to the selected word line.

The present disclosure further provides a memory system that includes a memory controller and a memory device configured to receive instructions from the memory controller to perform a read operation. The memory device includes memory cells addressed by word lines and bit lines, and a peripheral circuit configured to apply a read voltage to a selected word line and apply a pass voltage to an unselected word line adjacent to the selected word line, wherein a magnitude of the pass voltage is adjusted according to the read voltage applied to the selected word line.

The foregoing description of the specific embodiments will so fully reveal the general nature of the present disclosure that others can, by applying knowledge within the skill of the art, readily modify and/or adapt, for various applications, such specific embodiments, without undue experimentation, and without departing from the general concept of the present disclosure. Therefore, such adaptations and modifications are intended to be within the meaning and range of equivalents of the disclosed embodiments, based on the disclosure and guidance presented herein. It is to be understood that the phraseology or terminology herein is for the purpose of description and not of limitation, such that the terminology or phraseology of the present specification is to be interpreted by the skilled artisan in light of the disclosure and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections can set forth one or more but not all exemplary embodiments of the present disclosure as contemplated by the inventor(s), and thus, are not intended to limit the present disclosure and the appended claims in any way.

The breadth and scope of the present disclosure should not be limited by any of the above-described exemplary embodiments, but should be defined only in accordance with the following claims and their equivalents.

What is claimed is:

1. A memory device, comprising:
memory cells addressed by word lines and bit lines; and
a peripheral circuit for performing a read operation for the memory device, the peripheral circuit configured to:
apply a read voltage to a selected word line, wherein the selected word line is selected as one word line from among the word lines and a remainder of the word lines are unselected;
responsive to the read voltage having a first value, apply a second pass voltage to an unselected word line adjacent to the selected word line;
responsive to the read voltage subsequently having a second value, apply a first pass voltage to the unselected word line adjacent to the selected word line, the second value being less than the first value and the first pass voltage being greater in value than the second pass voltage; and responsive to the read voltage subsequently having a third value, continue applying the first pass voltage to the unselected word line adjacent to the selected word line, the third value being less than the second value.

2. The memory device of claim 1, wherein:

the read voltage comprises a first read reference voltage and a second read reference voltage that is higher than the first read reference voltage; and the first pass voltage and the second pass voltage are applied to the unselected word line when the first read reference voltage and the second read reference voltage are applied to the selected word line, respectively.

3. The memory device of claim 2, wherein:

the read voltage further comprises a first group of read reference voltages and a second group of read reference voltages that are higher than the first group of read reference voltages;

the first pass voltage is applied to the unselected word line when any read reference voltage in the first group is applied to the selected word line; and the second pass voltage is applied to the unselected word line when any read reference voltage in the second group is applied to the selected word line.

4. The memory device of claim 2, wherein the peripheral circuit is further configured to:

apply a further pass voltage to a further unselected word line that is not adjacent to the selected word line, wherein the further pass voltage is lower than the first or second pass voltage applied to the unselected word line adjacent to the selected word line.

5. The memory device of claim 4, wherein the first or second pass voltage and the further pass voltage are configured to switch on the memory cells coupled to the pass voltage and the further pass voltage.

6. The memory device of claim 4, wherein the second pass voltage is higher than the further pass voltage by 0.5V to 1 V, and the first pass voltage is higher than the further pass voltage by 1 V to 2V.

7. The memory device of claim 1, wherein the read voltage comprises one or more read reference voltages, and each of the one or more read reference voltages distinguishes two logic states of the memory cells.

8. A method for performing a read operation for a memory device, the memory device comprising memory cells addressable through word lines and bit lines, the method comprising:

applying a read voltage to a selected word line, wherein the selected word line is selected as one word line from among the word lines and a remainder of the word lines are unselected;

responsive to the read voltage having a first value, applying a second pass voltage to an unselected word line adjacent to the selected word line, wherein a magnitude of the pass voltage or the second pass voltage is adjusted according to the read voltage applied to the selected word line;

responsive to the read voltage subsequently having one of a second value, applying a first pass voltage to the unselected word line adjacent to the selected word line, the second value being less than the first value and the first pass voltage being greater in value than the second pass voltage;

responsive to the read voltage subsequently having a third value, continue applying the first pass voltage to the unselected word line adjacent to the selected word line, the third value being less than the second value.

9. The method of claim 8, further comprising:

applying a first read reference voltage to the selected word line at a first time;

applying a third pass voltage to the unselected word line at the first time;

applying a second read reference voltage to the selected word line at a second time, wherein the second read reference voltage is higher than the first read reference voltage; and applying a fourth pass voltage to the unselected word line at the second time, wherein the fourth pass voltage is lower than the third pass voltage.

10. The method of claim 9, further comprising:

applying the third pass voltage to the unselected word line when the read voltage applied to the selected word line comprises a first group of read reference voltages; and applying the fourth pass voltage to the unselected word line when the read voltage applied to the selected word line comprises a second group of read reference voltages, wherein the second group of read reference voltages comprise magnitudes higher than the first group of read reference voltages.

11. The method of claim 9, further comprising:

applying a further pass voltage to a further unselected word line that is not adjacent to the selected word line, wherein the further pass voltage is lower than the third or fourth pass voltages applied to the unselected word line adjacent to the selected word line.

12. The method of claim 11, wherein the third or fourth pass voltages and the further pass voltage are configured to switch on the memory cells coupled to the third or fourth pass voltages and the further pass voltage.

13. The method of claim 11, wherein the fourth pass voltage is higher than the further pass voltage by 0.5V to 1 V, and the third pass voltage is higher than the further pass voltage by 1 V to 2V.

14. The method of claim 8, wherein the applying of the read voltage comprises applying one or more read reference voltages, wherein each of the one or more read reference voltages distinguishes two logic states of the memory cells.

15. A memory system, comprising:

a memory controller; and a memory device configured to receive instructions from the memory controller to perform a read operation, the memory device comprising:

memory cells addressed by word lines and bit lines; and a peripheral circuit configured to:

apply a read voltage to a selected word line, wherein the selected word line is selected as one word line from among the word lines and a remainder of the word lines are unselected;

responsive to the read voltage having a first value, apply a second pass voltage to an unselected word line adjacent to the selected word line, wherein a magnitude of the pass voltage or the second pass voltage is adjusted according to the read voltage applied to the selected word line;

responsive to the read voltage subsequently having one of a second value, apply a first pass voltage to the unselected word line adjacent to the selected word line, the second value being less than the first value and the first pass voltage being greater in value than the second pass voltage; and responsive to the read voltage subsequently having a third value, continue applying the first pass voltage to the unselected word line adjacent to the selected word line, the third value being less than the second value.

16. The memory system of claim 15, wherein:

the read voltage comprises a first read reference voltage and a second read reference voltage that is higher than the first read reference voltage; and the first pass voltage and the second pass voltage are applied to the unselected word line when the first read reference voltage and the second read reference voltage are applied to the selected word line, respectively.

17. The memory system of claim 16, wherein:

the read voltage further comprises a first group of read reference voltages and a second group of read reference voltages that are higher than the first group of read reference voltages;

the first pass voltage is applied to the unselected word line when any read reference voltage in the first group is applied to the selected word line; and the second pass voltage is applied to the unselected word line when any read reference voltage in the second group is applied to the selected word line.

18. The memory system of claim 16, wherein the peripheral circuit is further configured to:

apply a further pass voltage to a further unselected word line that is not adjacent to the selected word line, wherein the further pass voltage is lower than the first or second pass voltage applied to the unselected word line adjacent to the selected word line.

19. The memory system of claim 18, wherein the pass voltage and the further pass voltage are configured to switch on the memory cells coupled to the first or second pass voltage and the further pass voltage.

20. The memory system of claim 15, wherein the read voltage comprises one or more read reference voltages, and each of the one or more read reference voltages distinguishes two logic states of the memory cells.

* * * * *